(12) United States Patent
Hsieh et al.

(10) Patent No.: US 6,751,702 B1
(45) Date of Patent: Jun. 15, 2004

(54) METHOD FOR AUTOMATED PROVISIONING OF CENTRAL DATA STORAGE DEVICES USING A DATA MODEL

(75) Inventors: Christine Hsieh, Mountain View, CA (US); Glenn Ferguson, San Jose, CA (US); Gerardo Lopez-Fernandez, San Jose, CA (US)

(73) Assignee: Loudcloud, Inc., Sunnyvale, CA (US)

( * ) Notice: Subject to any disclaimer, the term of this patent is extended or adjusted under 35 U.S.C. 154(b) by 560 days.

(21) Appl. No.: 09/699,347

(22) Filed: Oct. 31, 2000

(51) Int. Cl.[7] ............................................... G06F 13/20
(52) U.S. Cl. ...................................................... 711/112
(58) Field of Search ................................. 711/112, 114, 711/154, 170, 173, 147

(56) References Cited

U.S. PATENT DOCUMENTS 6,145,028 A * 11/2000 Shank et al. ................... 710/31
6,640,278 B1 * 10/2003 Nolan et al. ..................... 711/6

* cited by examiner

*Primary Examiner*—Kevin L. Ellis
(74) *Attorney, Agent, or Firm*—Burns, Doane, Swecker & Mathis, L.L.P.

(57) ABSTRACT

Techniques and systems for modeling and provisioning complex storage devices are described. A data model provides for entity relationships between physical and logical components of the storage devices. The data model is usable to provision the devices in a uniform, automated and secure manner.

21 Claims, 11 Drawing Sheets

METHOD FOR AUTOMATED PROVISIONING OF CENTRAL DATA STORAGE DEVICES USING A DATA MODEL

BACKGROUND OF THE INVENTION

The present invention relates generally to centralized storage devices, and more particularly to automated provisioning of centralized storage devices to be used in network computing applications.

Many modern day computer systems rely heavily on networking technology. As computer networks become more and more prevalent, a common practice of using centralized storage devices is gaining popularity. This technique ensures that all devices on the computer network have access to the same data, and allows for better maintenance and monitoring by a system administrator.

There are multiple configurations in which centralized data storage devices may be used in a computer networking environment. Some of the more commonly used configurations are implemented in what are known as storage networks. Storage networks are used to tie multiple hosts to a single storage system, and may be either a storage area network (SAN), or a network attached storage system (NAS). These two types of storage networks differ primarily in the manner in which the devices on the network are attached to the storage system. In an SAN configuration, the devices are attached to the centralized storage device by way of channels, or direct connections from the devices to the centralized storage device. In an NAS configuration, the devices of the computer network are attached to the centralized storage device by way of a network, or virtual, connection. Thus, storage devices in SANs are considered to be channel attached devices, while storage devices in NASs are known as network attached devices.

In storage networks, many different types of storage devices may be used. One common type of storage device, which may be used in a central location is a redundant array of independent disks (RAID). A RAID uses a controller and two or more disk drives to store data. RAID systems have different configuration levels, such as RAID0, RAID1, RAID2, RAID3, RAID4, RAID5, RAID6, RAID7, RAID10, and RAID53. Depending upon the specific configuration of the RAID device used for centralized data storage, various advantages may be obtained. Some of the advantages generally obtained through use of a RAID device include increased input/output (I/O) performance, increased fault tolerance, and data redundancy. The degree to which each of these advantages is obtained depends upon the specific RAID configuration. For more information regarding RAID technology in general, a general description of each of the RAID configurations can be found on the Internet at the following URL: http://www.raid5.com.

One of the elements involved in RAID storage is data striping. Data striping is a technique whereby data elements are broken into specific blocks and written to different disks within the disk array of the RAID storage device. This improves access time as the controller, which accesses each of the disks within the disk array, may spread the load of I/O requests across many channels and many disk drives. Additionally, data may be backed up using various data redundancy algorithms, such as parity storage algorithms, or the like.

One of the leading manufactures of RAID storage devices is EMC Corporation of Hopkinton, Mass. EMC Corporation manufactures a variety of RAID storage devices that may be used in storage networks such as SANs and NASs. Enterprise Storage Systems, or EMC devices manufactured by EMC Corporation, are generally highly scalable and provide high availability of information to network clients. While EMC devices are among some of the more commonly used RAID devices for a large storage network applications, other systems using RAID technology are also used in many storage network applications.

While the advantages of using RAID storage devices, such as EMC devices for example, are desirable, there are also some difficulties associated with using these types of storage devices. For example, because data is written in blocks to multiple disk drives, rather than a single disk drive, it is difficult to ascertain the location of a single file, as it is distributed among the various disk drives of the RAID storage device. Nonetheless, knowledge of where data files are stored on a central storage device is important, particularly for applications wherein the hosts which store their data on the same RAID storage device are not permitted to access each others data. This situation may occur, for example, in an Internet service hosting network environment, wherein a RAID storage device is used to centrally store data corresponding to multiple clients' accounts. In such a situation, it would be crucial that client A have access to only client A's data, and that no other clients, such as clients B and C have access to client A's data, e.g., financial transaction information, such as credit card account information, or proprietary business operations information.

Another complicating factor involves the connective topology between the central storage device and the various hosts whose data reside on the central storage device. As shown in FIG. 1, typically a central storage device 8, e.g., an EMC frame, has a number 1–N of different ports (some of which are illustrated using reference numerals 10, 12, 14, 16) through which data can be passed via direct connections between hosts 1–N and the central storage device 8. The number of ports provided to the central storage device 8 may be very limited, e.g., twelve. Thus, using the direct attachment scheme depicted in FIG. 1 would only permit the central storage device to be connected to N hosts, where N is defined by the number of ports provided to the central storage device 8. This result will be inefficient, in an environment wherein the central storage device 8 is able to provide a greater data throughput to each port 10–16 than will be used by an individual host 1–N. Since the central storage device 8 is a very expensive piece of equipment, it is highly desirable to make more efficient use of its limited number of ports.

Accordingly, a switching matrix 18 can be introduced between the central storage device 8 and the hosts which store their data on the central storage device as shown in FIG. 2. The switching matrix 18 may, for example, be comprised of a number of fiber switches (not shown). By introducing the switching matrix 18 between the central storage device 8 and the hosts, a larger number of hosts 1–Y can share the limited number of ports 1–N available at the central storage device 8. This provides a more efficient usage of the capabilities of the central storage device 8, but at the expense of introducing additional complexity into the pathway between any given host and its data. This complexity makes it particularly challenging to accomplish the task of provisioning these types of central storage devices, i.e., to identify and allocate storage space to any of the hosts 1–Y on an ongoing basis.

As will be appreciated by the foregoing, it is difficult to model the data contained within such complex storage devices. Modeling the topology of the storage device and associated interfaces (e.g., switches and ports) would be useful to ensure that each client has access to only its data and that no client can access the data of another client. In providing a data model of the centralized storage device, it can be readily ascertained who has access to which data, and which ports should be connected to a specific portion of the centralized storage device in an SAN storage network, or which network address should have access to a particular portion of the storage device in an NAS storage network.

Therefore, it would be desirable to develop a data model of a centralized storage device to be used in a network, such as a storage network, to provide a better understanding of where data for particular clients is located on the storage device, and to aid in preventing access to a client's data by anyone other than that client. Additionally, it would be desirable to provide a system and method for automatically provisioning a central storage device, thereby eliminating the possibility of human error in such provisioning, and thereby providing a greater assurance of the security of a client's data contained on the central storage device.

SUMMARY

In accordance with the present invention, these objectives are achieved by the provision of a data model for characterizing a storage device, a system and method for managing data storage device on a network, and a system and method for modeling data of a network storage device.

An exemplary data model for characterizing a data storage device connected to a computer network according to the present invention may include a plurality of related entities. Each entity is associated with one or more entities in a one-to-many relationship or a many-to-one relationship. Each entity is also characterized by a variable set, the values of which identify physical instances of each entity in the data model, e.g., a storage device or a switch. The variable sets also include primary keys which interrelate the variable sets of interconnected entities within the model.

A method for allocating storage to a host within a central data storage device having at least one switch disposed therebetween using a data model according to the present invention may, for example, include the steps of: (a) informing the central storage device that the host is authorized to access a predetermined storage area, the predetermined storage area being a subset of said unallocated storage space; (b) creating a path through the switch between the central data storage device and the host; and (c) informing the host that the predetermined storage area has been allocated thereto, wherein at least one of steps (a)–(c) is performed using information extracted from a data model associated with said the storage device.

Further features of the invention, and the advantages offered thereby, are explained in greater detail hereinafter with reference to specific embodiments illustrated in the accompanying drawings.

DETAILED DESCRIPTION

To facilitate an understanding of the principles and features of the present invention, it is explained hereinafter with reference to its implementation in an illustrative embodiment. In particular, the invention is described in the context of a RAID network storage device, such as an EMC storage device, used to store data, which is accessible via a plurality of hosts. It will be appreciated, however, that this is not the only embodiment in which the invention can be implemented. Rather, it can find utility in a variety of computer network configurations, using a variety of suitable storage devices, as will become apparent from an understanding of the principles that underscore the invention.

Figure 3:
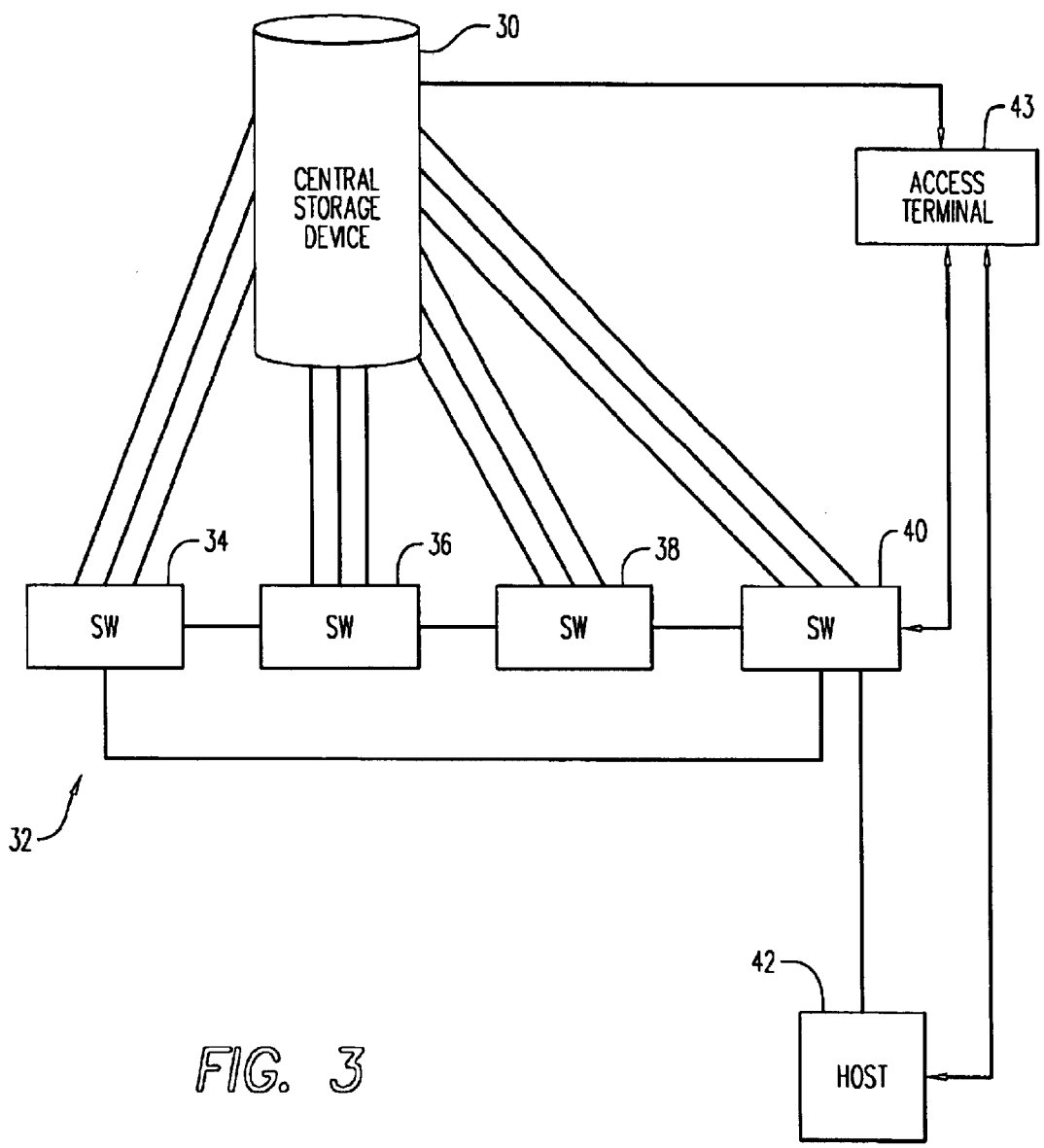
FIG. 3 depicts an attachment topology according to the present invention.

An exemplary storage network of the type in which the present invention can be employed is illustrated in block diagram form in FIG. 3. Therein, a central storage device 30, e.g., an EMC frame, is connected via a plurality of optical links to a switching matrix 32. In this exemplary embodiment, four fiber switches 34, 36, 38 and 40 are employed in the switching matrix 32, each of which are connected to the central storage device 30 using three ports and three optical links. The switches 34, 36, 38 and 40 are each connected to two of the other switches 34, 36, 38 and 40 as shown to enable a single switch configuration to promulgate throughout the switching matrix 32 rather than requiring that each switch in the matrix be separately configured. Those skilled in the art will appreciate that the exemplary topology of FIG. 3 is only one exemplary manner in which a switching matrix 32 can be configured for interfacing between central storage device 30 and a plurality of hosts and that the present invention is applicable to any such configurations. Moreover, although only one host 42 is illustrated in FIG. 3, to permit the exemplary configuration of the switching matrix 32 to stand out more clearly, those skilled in the art will further appreciate that a large number of hosts may be connected to the switching matrix 32 so as to access their data stored in the central data storage device 30. An access terminal 43 is also shown which permits an operator to have access to each of the switches 34, 36, 38 and 40, as well as the central storage device 30 and the host 42 for configuration purposes associated with the provisioning of the central storage device 30 which will be described in more detail below.

Figure 4:
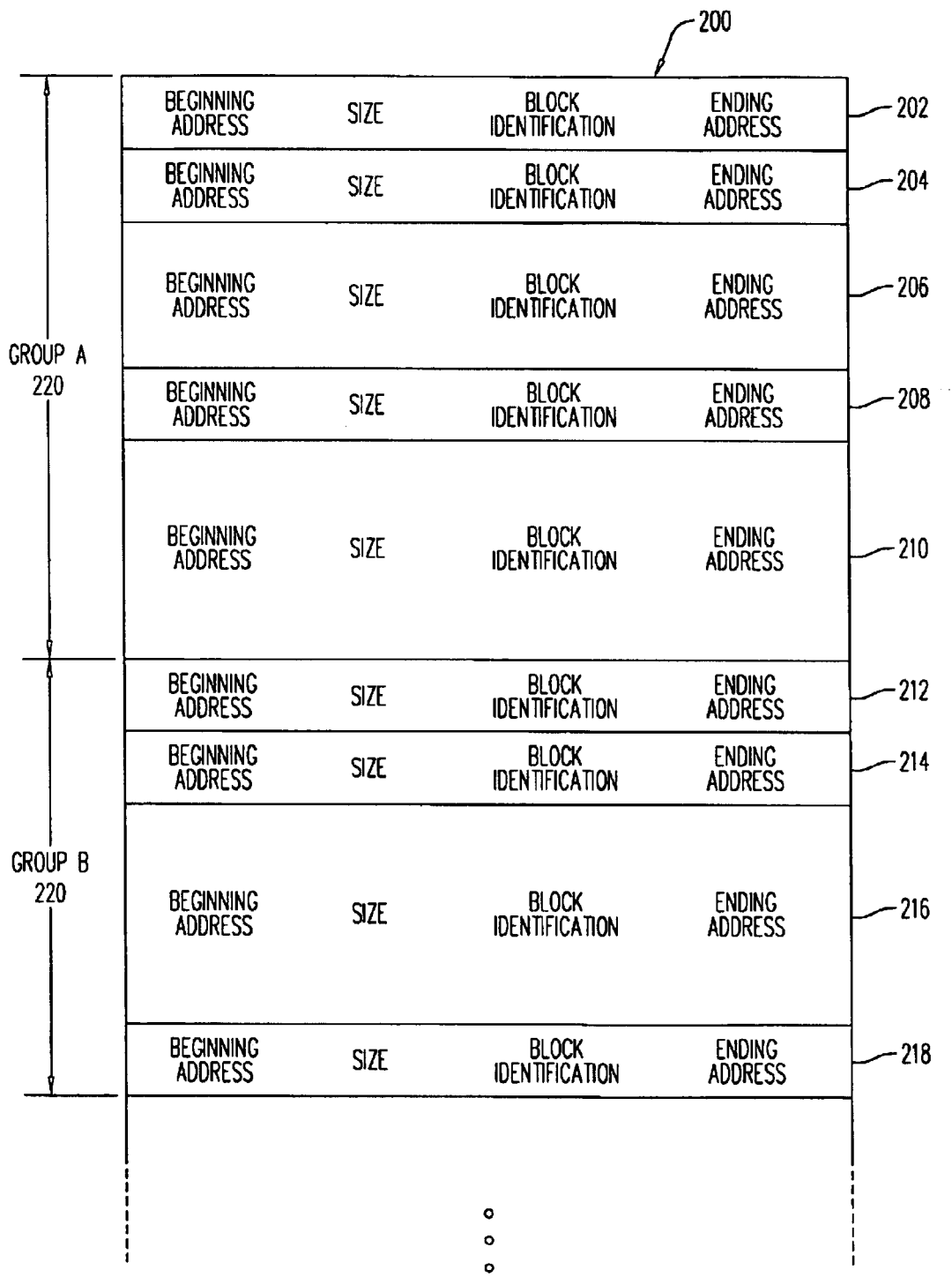
FIG. 4 is a diagram illustrating details of storage media used in connection with the present invention.

FIG. 4 is a diagram of the storage media contained within an exemplary central storage device 30. It will be recognized by those skilled in the art that similar diagrams may be devised for specific network storage devices, such as EMC devices and other devices, by way of modifications to the elements of this exemplary diagram. Therein, multiple segments of the storage medium are defined as logical volumes (sometimes referred to as "hypers") 202, 204, 206, 208, 210, 212, 214, 216, and 218. Each of these volumes is defined by a beginning and ending address, and has a field indicating the size of the volume. Additionally, each volume contains a volume identification field that uniquely identifies that particular volume within the central storage device 30. Volumes may be of different sizes, as illustrated by the varying widths of the volumes in FIG. 4. For example, the first volume 202 is approximately one half of the size of the third volume 206, and approximately one third of the size of the fifth volume 210. That is, if the first volume 202 has a size of one gigabyte, the third volume 206 would have a size of approximately two gigabytes, and the fifth volume 210 would have a size of approximately three gigabytes.

The storage medium illustrated in the volume diagram 200 of FIG. 4 is also characterized by larger segments of memory called groups (sometimes referred to as "metas"). A group is made up of multiple, contiguous volumes within the storage medium. For example, group A 220 is made up of the first five volumes 202, 204, 206, 208, 210. Group B 222 is made up of the next four contiguous volumes 212, 214, 216, 218. The storage medium 200 of FIG. 4 may include a larger number of groups, however only two are illustrated therein for the sake of convenience. The groups of the storage medium 200 are defined by the beginning address of the first volume contained within that group, and the ending address of the last volume of the contiguous of volumes contained within the group. For example, group A 220 is defined by the beginning address of volume 202, which is the first volume contained within group A 220, and the ending address of volume 210, which is the last contiguous volume contained within group 220. Similarly, group B 222 is defined by the beginning address of volume 212, which is the first volume contained within group B 222, and the ending address of group 218, which is the last contiguous volume contained within group B 222.

It will be appreciated by those skilled in the art that the number of groups and volumes defined within a central storage device 30 may vary according to the various data characteristics intended to be stored thereon. Thus, it will be appreciated that the definition groups and volumes need not be limited to those illustrated in FIG. 4, which are provided for illustration purposes only. Additionally, the number and size of volumes contained within each group may vary widely depending upon the specific application for which a storage device containing such a storage medium configuration is used, and need not be limited by the figures or illustrations associated with the volumes contained in FIG. 4.

Figure 1:
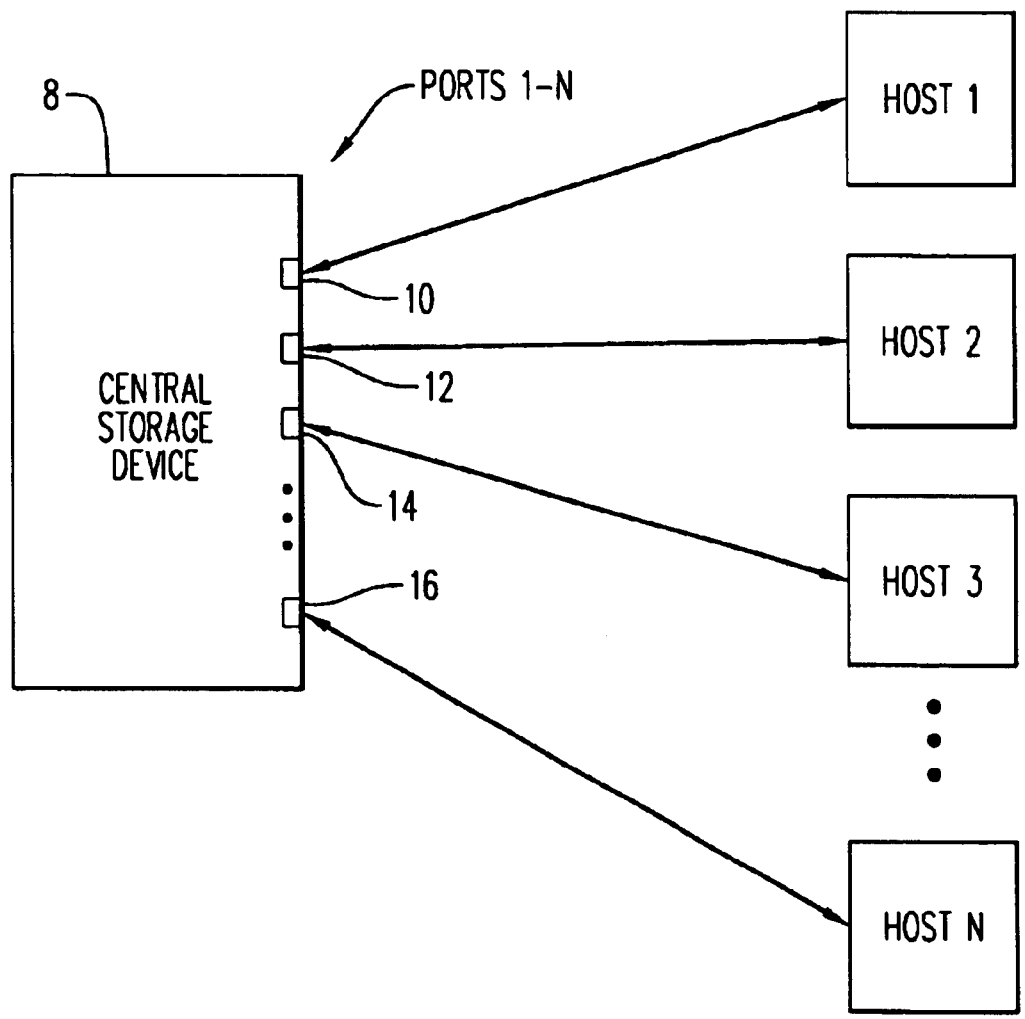
FIG. 1 depicts a conventional direct attachment topology between a central storage device and a plurality of hosts.
Figure 5:
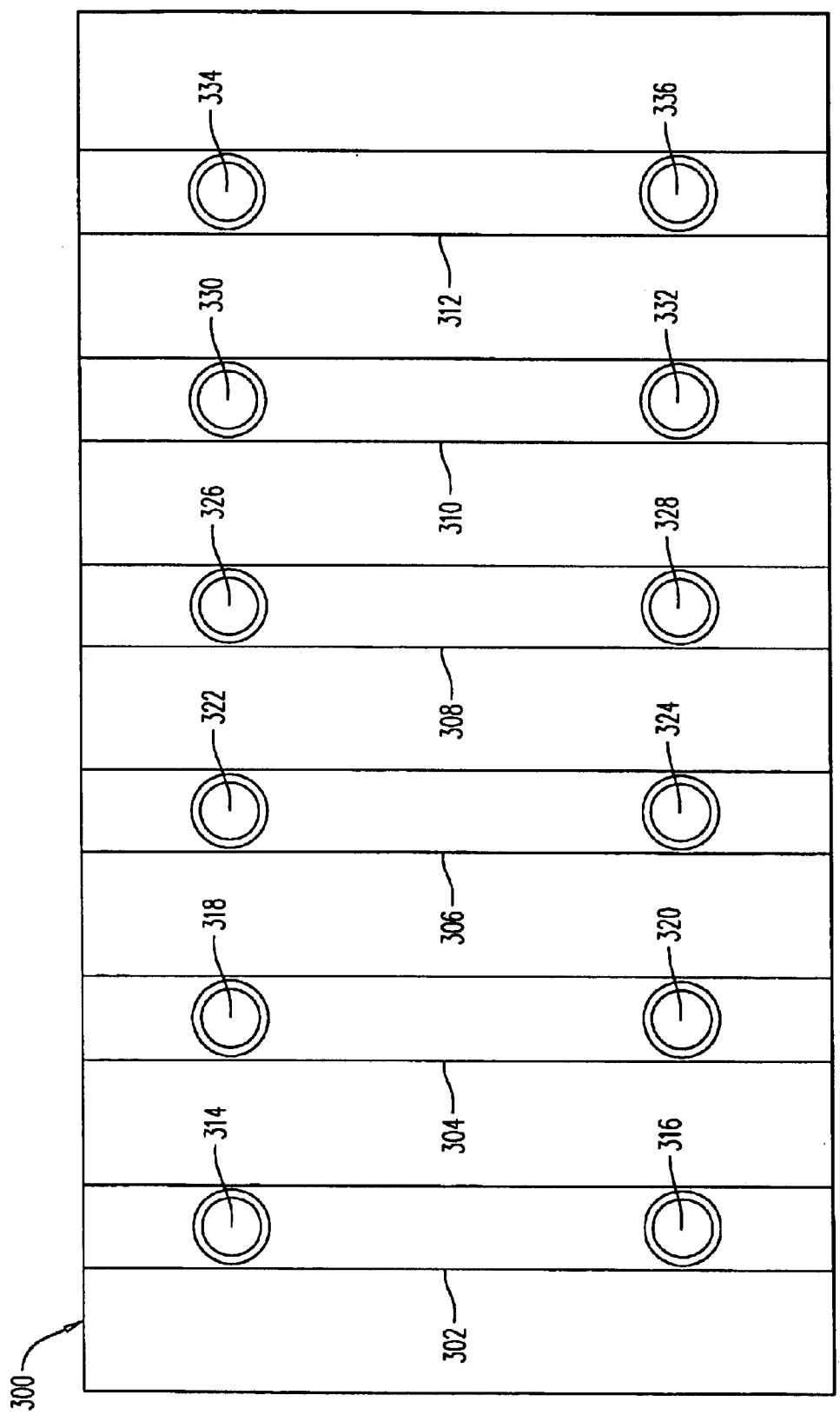
FIG. 5 is a diagram depicting ports which are available at the central storage device.

In FIG. 5, an access panel 300 is provided for allowing direct connections to the central storage device for accessing data contained on the storage mediums thereof. This access is provided by way of multiple adaptors 302, 304, 306, 308, 310, 312. Each of these adaptors may be an individual computer interface card, which may be interchangeable, or more permanent. Upon each of these adaptors 302, 304, 306, 308, 310, 312 is one or more adaptor ports 314, 316, 318, 320, 322, 324, 326, 328, 330, 332, 334, 336, which correspond to the ports 1-N described above with respect to FIGS. 1 and 2. By way of these adaptor ports of the adaptor cards, access may be gained to the storage medium of the storage device. For example, group A 220 of the storage medium 200 in FIG. 4 may be displayed, or accessed, through one or more ports contained within the access panel 300. Which group is seen through which port or ports may be a dynamic definition, that changes as data contained within the storage device changes.

It will be appreciated by those skilled in the art that actual physical adaptor ports, such as the ones shown in FIG. 5, are to be used in SAN storage networks, as they provide a channel attached storage network by allowing devices to be connected directly via cable to the storage device. However, it should be recognized that the ports illustrated in FIG. 5 are only one embodiment of the ports that may be used in storage devices associated with the present invention. It is contemplated that virtual adaptor ports, which allow for the storage device to provide access to portions of data stored therein in a NAS storage network, which is networked attached, may also be used with an embodiment of the present invention. Accordingly, any such network attached devices making use of virtual ports or network ports are intended to be encompassed within the scope of the present invention.

Figure 6:
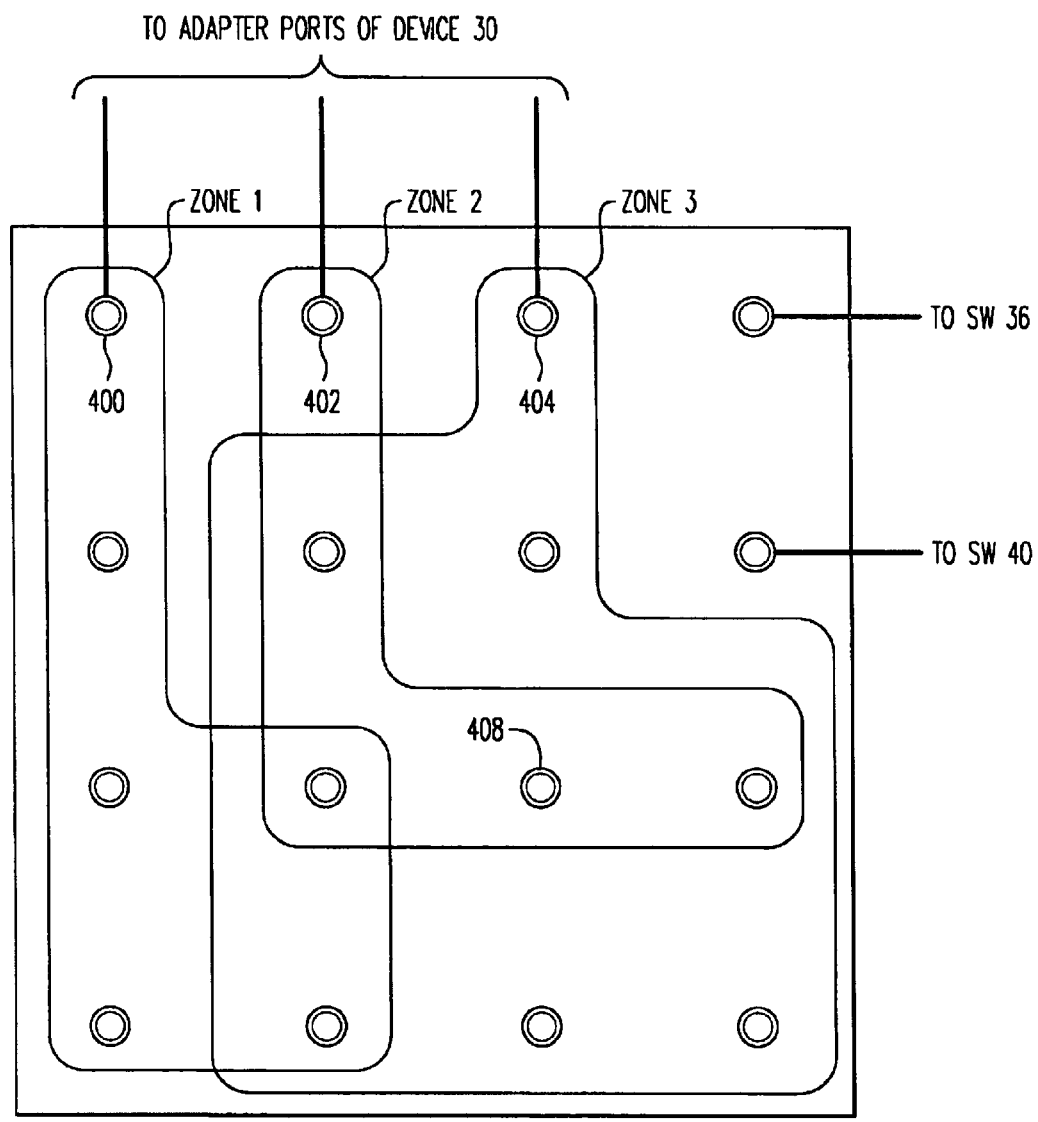
FIG. 6 illustrates an exemplary zoning of the ports of a switch.

FIG. 6 is a block diagram which depicts an exemplary set of ports associated with fiber switch unit 34. Although sixteen ports are illustrated by the dots set forth therein, those skilled in the art will appreciate that any number of ports may be built into fiber switch 34. Three of the ports 400, 402 and 404, in the upper left-hand portion of FIG. 6, are connected to the central storage device 30. Two of the ports are connected to switches 36 and 40 in switching matrix 32. Some or all of the remaining ports are connected to host devices (not shown in this FIG.). These connections may be accomplished by way of any communication channel, such as direct cable wiring, infrared line-of-sight connections, or the like.

The switch ports shown in FIG. 6 may be grouped into zones, which, by way of wiring or other connections, provide common access to the ports within each zone. Thus, for example, the six ports in zone 1 (in addition to port 400) share common access to the portions of the media within central storage device 30 that are made available by device 30's internal controller (not shown) to the adaptor port to which port 400 is connected. Likewise, those ports zoned in zones 2 and zone 3 share common access with respective portions of the media of central control device 30 to which ports 402 and 404 are connected via adaptor ports, respectively. Note that although only contiguous ports are zoned together in the example of FIG. 6, such is not required and is portrayed therein to more clearly describe this zoning concept. Moreover, while some of the ports are depicted as not belonging to any zones, such will only be the case for ports that are not connected to a host. Lastly, it will be seen that ports can belong to more than one zone, e.g., port 408, such that those ports can transact data through multiple adaptor ports on the central storage device 30.

Switch port zoning provides the mechanism whereby a plurality of hosts can be aggregated into the three data pipes available to switch 34 for connection with the central storage device 30. However, as mentioned above, this feature also adds to the complexity associated with allocating storage on the central storage device and defining the pathway thereto. Accordingly, exemplary embodiments of the present invention provide techniques for handling these issues.

Figure 7:
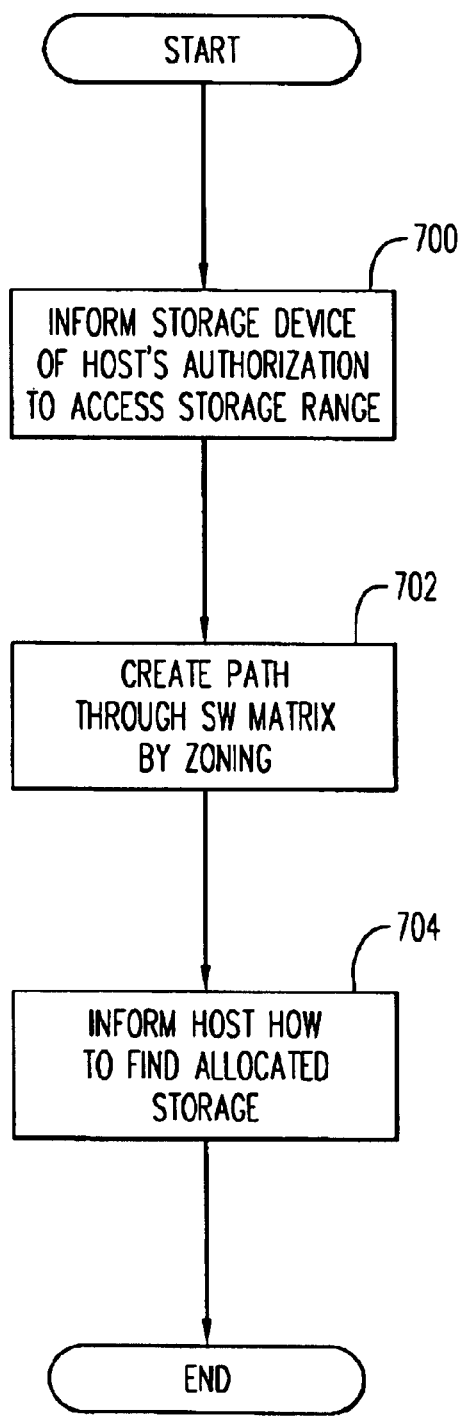
FIG. 7 is a flow diagram depicting an overall method for provisioning data storage devices.

As an overview, provisioning of central storage devices like those described above comprises three general steps which are depicted by the flow diagram of FIG. 7. First, at step 700, the controller (not shown) in the central storage device 30 needs to be informed that a particular host is authorized to access a particular range of storage within the central storage device. Then, a path is created from the host through the switching matrix to the allocated storage at step 702. Note that steps 700 and 702 can be performed in the reverse of the order in which they are described herein.

Finally, the host is informed of how to find the allocated storage via the path that has been created at step 704.

One difficulty associated with the use of centralized data storage devices, such as in the present invention, is that it is difficult to ascertain exactly which ports from a switching unit, such as the switch of FIG. 6, are able to access specific portions of the storage medium of the storage device by way of the adaptor ports, such as the adaptor ports illustrated in FIG. 5.

Because of the possible sensitivity of data contained within the storage device, especially in a multi-client, networking environment, it is important to grant access to only the portion of data contained within the storage device to those who are authorized to access it. Hence, an accurate data model of all of the data contained within the storage device and a mapping scheme between the devices, the ports of the switching matrix, such as switch of FIG. 6, the adaptor ports, such as the ones shown in FIG. 5, and the portions of storage media contained within a storage device is important to proper protection of data sensitivity.

One such application in which concern for this sensitivity of data may be involved is when devices accessing the storage device by way of multiple ports belong to different entities, such as different clients or customers. In such a situation, it is important to allow access to a particular customer's data only to that customer, or other authorized agents. However, in such a complex arrangement, it may be difficult to ensure that access to a customer's data is tightly controlled such that only that customer and authorized agents may access the data. This problem is exacerbated when individual customers apply different access levels to different users, or when multiple customers are added to the overall network. The problem is further complicated when, in a relatively short period of time, multiple new devices for existing and new customers are added to the network, and require storage space within the centralized storage device.

One solution to this problem is to automate the provisioning of the storage medium within the centralized storage device, and automate the assignment of ports to specific devices belonging to various client or customer groups. However, due to the complexity of the matrix between ports connected to devices, such as the ports of the switch in FIG. 6, and adaptor ports of the storage device, such as the adaptor ports of FIG. 5, it is extremely difficult to assign ports, and provision the storage device with any degree of reliability.

Figure 8:
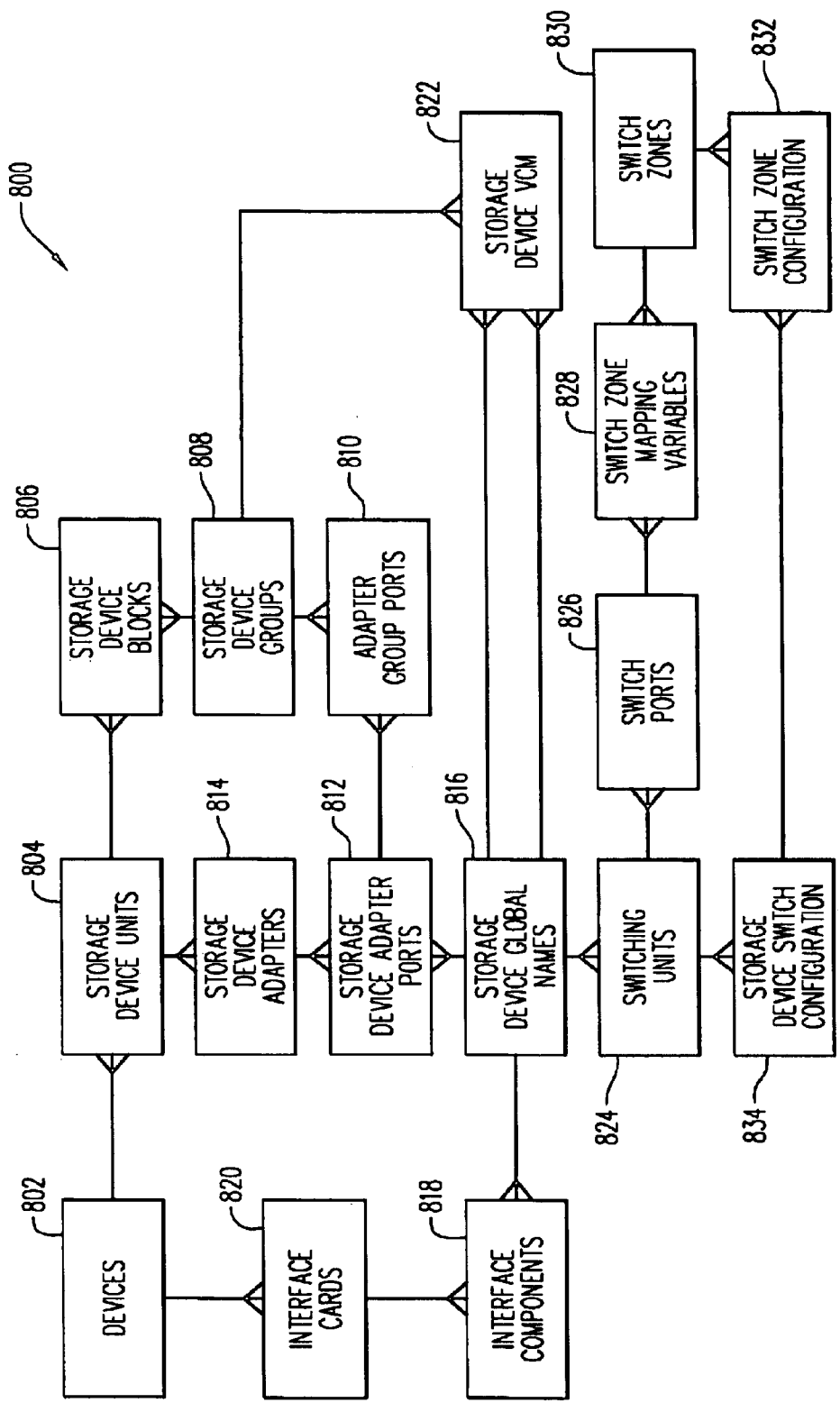
FIG. 8 is an entity relationship diagram of the data model of a network storage device used in connection with one embodiment of the present invention.
Figure 9:
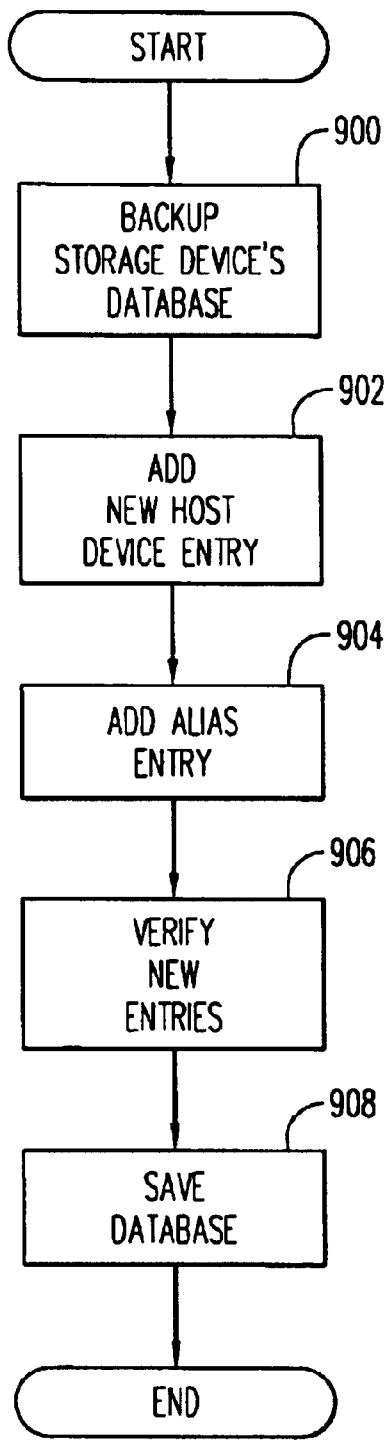
FIGS. 9 and 10 are flow diagram illustrating steps involving defining commands used to perform some of the provisioning steps of FIG. 7.

As part of exemplary embodiments of the present invention and as an aid to automatic provisioning of a storage device, and automatic assignment of ports to various devices, Applicants have developed the data model illustrated in FIG. 8. This data model 800 is illustrated in the form of an entity relationship diagram, which identifies the relationships between various entities associated with the storage device, which entities may be physical or virtual.

Each entity is represented by a rectangular block. These rectangular blocks are labeled to indicate their significance, and are connected by way of connection lines. Each line has a single connection on one end and multiple connections on the opposite end, indicating a one-to-many relationship, i.e., or indicating that a single entity is related to multiple, entities on the end of the line with multiple connections. Thus, for example, each device 802 (e.g., a computer) may be associated with many storage device units (e.g., RAIDS).

Each instance of the entities illustrated in FIG. 8 can be characterized by the values of a set of variables that interrelate the entities multiple variables to aid in relaying information to one another. Each variable set also includes a primary key, denoted in the following tables by an asterisk following the variable name. Each entities' primary key provides a link between the variable sets of related entities, i.e., each entity which has many-to-one relationship with another entity will include, in its variable set, the primary key of the other entity. For example, the Switch Zone Configuration entity 832 has a many-to-one relationship with both the Switch Zones entity 830 and the Storage Device Switch Configuration entity 834. Thus, the variable set associated with the Switch Zone Configuration entity 832 includes the primary keys from the variable sets of both entities 830 and 834.

The exemplary entity variables described below are not intended to be a comprehensive list, but merely to indicate some of the variables which can be used in relating information contained within the storage device to various ports, and zones contained on the switching unit. It will be recognized by those skilled in the art, however, that additional variables, or in some cases fewer variables, may be used to accomplish similar results. Also shown in the following charts are indications that the variables are "required" or "optional" for this exemplary embodiment. Those skilled in the art will also appreciate that these designations may vary.

Device Entities 802

In FIG. 8 device entities 802 are each connected to (or associated with) multiple storage device unit entities 804. These device entities 802 may relate to, for example, computers, computer peripherals, and other computer networking equipment. As mentioned above, the device entities 802 illustrated in FIG. 8 are characterized by a variable set, which is defined to aid the other entities connected thereto in conveying information to, and extracting information from, this entity. These variables are indicated below in Table 1.

TABLE 1

VARIABLE SET OF THE DEVICE ENTITIES 802

| VARIABLE | VARIABLE DEFINITION | VARIABLE TYPE | REQUIRED/ OPTIONAL |
| --- | --- | --- | --- |
| DVC-ID | Device identification number | Number | R |
| DVC_TYPE | Device type | Character | R |
| STATUS | Device Status | Character | R |
| EFF_BEG_DT | Effective beginning date | Date | R |
| DISCOVER_DT | Discovery date | Date | R |
| MID | Machine ID | Character | O |
| SERIAL_NUM | Serial Number | Character | O |
| DVC_MFG | Device manufacturer | Character | O |

TABLE 1-continued

VARIABLE SET OF THE DEVICE ENTITIES 802

| VARIABLE | VARIABLE DEFINITION | VARIABLE TYPE | REQUIRED/ OPTIONAL |
|---|---|---|---|
| DVC_MODEL | Device Model | Character | O |
| CHASSIS_SERIAL_NUM | Chassis serial number | Character | O |
| LOOPBACK_IP | Always Reachable IP address | Character | O |
| SYSTEM_NAME | Device system name | Character | O |
| SYSTEM_DESCRIPTOR | Device system description | Character | O |
| SYSTEM_OBJECT_ID | System object identification | Character | O |
| SYSTEM_LOCATION | System location | Character | O |
| SNMPV2C_CAPABLE | SNMP V.2c capability | Character | O |
| SNMPV3_CAPABLE | SNMP V.3 capability | Character | O |
| OS_VERSION | Operating system version | Character | O |
| DVC_DESC | Device description | Character | O |
| NOTES | General device notes | Character | O |
| SNMP_SYSTEM_LOCATION | SNMP location | Character | O |
| MONITORING_FLG | Device monitor flag | Character | O |

In Table 1, the primary key for each of the device entities 802 is the device identification variable, or DVC_ID, which uniquely identifies each central storage device. Also useful are the variables associated with the device type, status, effective beginning date, and discovery date of the device. The device type and status indicate the particular type of device, and its operating status to the network. The effective beginning date indicates to the network the initial date for this record in the database, and the discovery date indicates the date at which the device is first registered with the system. As indicated in Table 1, other variables can also be provided. The machine ID variable may reflect an identifier which is associated with the device for fast, remote identification. More information regarding these machine ID values may be found in U.S. patent application Ser. No. 09/632,796, entitled "SYSTEM FOR IDENTIFYING NETWORK SERVERS" filed on Aug. 4, 2000, to Joshua T. LeVasseur et al., the disclosure of which is incorporated here by reference. For example, information such as serial numbers, device manufacturers, chassis serial numbers, system information, operating system version information, and mail protocol capability may all be used to characterize devices by way of variables contained in Table 1. The system information and operating system version information can be that which would be reported from the device in response to an SNMP inquiry. Additionally, a device description variable may be used to indicate any additional information that is needed to be known by the network, and a monitoring flag may indicate any problems the device is having to the network.

In addition to the variables illustrated in Table 1, other variables could be developed and included to describe the device entities 802. The variables indicated in Table 1 may be combined with variables contained within other entities illustrated in FIG. 8, or may be discarded entirely depending upon the desired operation of the device entities 802 within the overall system.

Storage Device Unit Entities 804

These storage device unit entities 804 may correspond to, for example, RAID based storage devices such as EMC storage devices, or other suitable storage device units. As seen in FIG. 8, the data model depicts a many-to-one relationship between the entities 804 and 802 and a one-to-many relationship between entity 804 and entities 806 and 814. The storage device unit entities 804 are characterized by their own variable set, which values are illustrated below in Table 2.

TABLE 2

VARIABLE SET OF THE STORAGE DEVICE UNIT ENTITIES 804

| VARIABLE | VARIABLE DEFINITION | VARIABLE TYPE | REQUIRED/ OPTIONAL |
|---|---|---|---|
| DVC_ID | Device identification number | Number | R |
| DVC_SITE_ID | Storage Device site identification | Character | R |
| NAME | Storage device name | Character | R |
| MAX_NUM_DRIVERS | Maximum possible number of drivers | Number | R |
| MAX_NUM_ADAPTORS | Minimum possible number of adaptors | Number | R |

Contained in Table 2, are variables which define the device identification number, the storage device site identification, the storage device name, and the maximum number of drivers and adaptors that can be used with the present invention.

Storage Device Storage Blocks Entities 806

Figure 2:
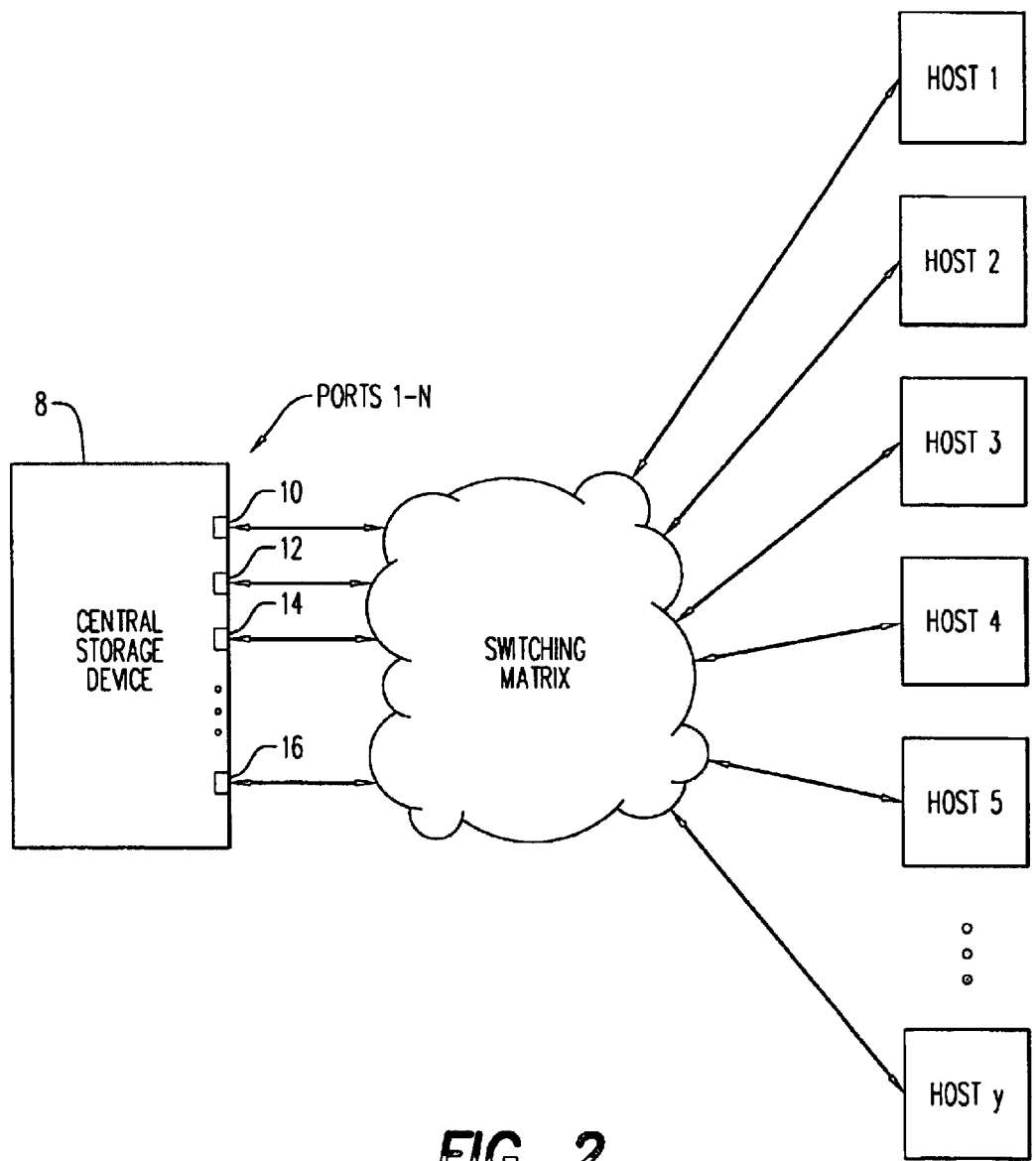
FIG. 2 depicts a conventional attachment topology wherein a switching matrix has been inserted between the central storage device and a plurality of hosts.

As indicated in FIG. 8, each storage device unit entity 804 relates to multiple storage device storage block entities 806, which entities may, for example, correspond to the storage blocks illustrated in FIG. 2, for example. The storage device storage block entities 806 used in the present invention are characterized a set of variables that are illustrated below in Table 3.

TABLE 3

VARIABLE SET OF THE STORAGE DEVICE STORAGE BLOCK ENTITIES 806

| VARIABLE | VARIABLE DEFINITION | VARIABLE TYPE | REQUIRED/ OPTIONAL |
|---|---|---|---|
| BLOCK_ID | Block identification number | Number | R |
| GROUP_VOL_ID | Group identification number | Number | R |
| DVC_ID | Device identification number | Number | R |
| HEX_ADDR | Hexadecimal address | Character | R |
| STATUS | Block status | Character | R |
| STORAGE_SIZE | Block storage size | Character | R |
| GROUP_ORDER | Group order | Number | R |

Table 3 above illustrates the set of variables used by the storage device storage block entities 806. Each storage block has its own identification number, and retains the group volume identification number of the group containing the block. Additionally, a device identification number is stored, and information such as the hexadecimal memory address of the block, the block status, the block storage size, and the group order of the block. This latter variable identifies the order in which the blocks are stored within the group and can be used to determine the begin and end addresses for each volume. Each of these variables is designated, in this exemplary embodiment, as required for the storage device storage block entities 806.

Storage Device Storage Group Entities 808

As discussed in connection with FIG. 2, multiple storage block entities 806 make up various storage device storage group entities 808. The storage device storage group entities 808 each utilize multiple variables, which are each required for the operation of these groups. These variables are indicated below in Table 4.

TABLE 4

VARIABLE SET OF THE STORAGE DEVICE STORAGE GROUP ENTITIES 808

| VARIABLE | VARIABLE DEFINITION | VARIABLE TYPE | REQUIRED/ OPTIONAL |
|---|---|---|---|
| GROUP_VOL_ID | Group identification number | Number | R |
| HEAD_HEX_ADDR | Group beginning address | Character | R |
| END_HEX_ADDR | Group ending address | Character | R |
| TARGET | Target number | Character | R |
| LUN | Logical Unit Number | Character | R |
| FUNC_TYPE | Function type | Character | R |
| PROTECTION_TYPE | Protection type | Character | R |
| STATUS | Group status | Character | R |

The variables associated with the storage device storage group entities 808, shown above in table 4, include a group identification number to identify a particular memory group. In addition, as illustrated in FIG. 2, beginning and ending addresses for the memory group are provided. The target and LUN variables are part of the characterizing string which identifies a mounted disk in the central storage device 30, e.g., dev/dsk/c#t#d#s#, where c refers to the controller number, t# refers to the target number (stored as a variable in this entity), d# refers to the disk number (referred to herein as the logical unit number or LUN) and s# refers to the slice number. Additionally, variables define the function type and protection type of the group, along with the status of the group.

Adaptor Group Port Entities 810

The storage device group entities 808 may be connected to one or more adaptor group port entities 810, one or more of which may be connected to various storage device adaptor port entities 812. The variable set associated with the adaptor group port entities 810 are shown below in Table 8.

TABLE 5

VARIABLE SET OF THE ADAPTOR GROUP PORT ENTITIES 810

| VARIABLE | VARIABLE DEFINITION | VARIABLE TYPE | REQUIRED/ OPTIONAL |
|---|---|---|---|
| ADAPTOR_PORT_10 | Adaptor port identification number | Number | R |
| GROUP_VOL_ID | Group identification number | Number | R |

Table 5 contains the variables of the adaptor group port entities 810. These variables include the adaptor port identification number and the group identification number associated with each adaptor port identified by the adaptor port identification number. Each of these variables is required, according to this exemplary embodiment of the present invention, for the characterization of the adaptor group port entities 810.

Storage Device Adaptor Port Entities 812

The storage device adaptor port entities 812 may be associated with storage device adaptor ports, such as ports 314–316 illustrated in FIG. 3. The variable set of the storage device adaptor port entities 812 are outlined in Table 6, shown below.

TABLE 6

VARIABLE SET OF THE STORAGE DEVICE ADAPTOR PORT ENTITIES 812

| VARIABLE | VARIABLE DEFINITION | VARIABLE TYPE | REQUIRED/ OPTIONAL |
|---|---|---|---|
| ADAPTOR_PORT_ID | Adaptor port identification | Number | R |
| WWN_ID | Word wide (Global) name Identification number | Number | R |

| | | | |
|---|---|---|---|
| ADAPTOR_ID | Adaptor identification number | Number | R |
| OPERATING_SYSTEM | Operating system | Character | O |
| SLOT | Adaptor slot | Character | R |

Table 6 indicates the set of variables associated with the storage device adaptor port entities 812. These variables include an adaptor port identification number, a global name identification number, an adaptor slot identification. The adaptor identification may correspond to the physical and adaptor upon which the adaptor port resides. Additionally, an operating system indication may optionally be made which indicates the operating system used by the adaptor port.

Storage Device Adaptor Entities 814 As illustrated in FIG. 3, one or more storage device adaptor port entities 812 may be associated with physical device adaptor port situated on each storage device adaptor associated with the multiple storage device adaptor entities 814 related to each storage device unit entity 804. The set of variables associated with the storage device adaptors are shown below in Table 7.

TABLE 7

VARIABLE SET OF
THE STORAGE DEVICE ADAPTOR ENTITIES 814

| VARIABLE | VARIABLE DEFINITION | VARIABLE TYPE | REQUIRED/ OPTIONAL |
|---|---|---|---|
| ADAPTOR_ID | Adaptor identification number | Number | R |
| DVC_ID | Device identification number | Number | R |
| ADAPTOR_TYPE | Type of adaptor | Character | R |
| SLOT | Adaptor slot | Character | R |
| CACHE_SIZE | Size of adaptor cache | Character | O |

Within Table 7, an adaptor identification number is indicated along with a device identification number. The type of adaptor along with the physical slot in which it is inserted are contained within variables in this table as well. Additionally, an indication as to the size of the adaptor cache may be made.

Storage Device Global Name Entities 816 Storage device global name entities 816 are assigned to one or more storage device adaptor port entities 812 and one or more interface component entities 818. These storage device global name entities 816 serve as global variables, which globally define identification names for each of the storage device adaptor port entities 812, interface component entities 818, storage device VCM entities 822, and switching unit entities 824. The storage device global name entities 816 is a key aspect to the present invention. As can be discerned from FIG. 8, storage device global name entities 816 is a central to the entity relationships described therein and are used to relate devices to the storage device units by way of their adaptor ports, and to switching units. This is accomplished by assigning specific, unique global names to each of the entities with which it relates, and with which it comes in contact. As such, the variable set associated with the storage device global name entities 816 include a worldwide, or global, identification number, and a worldwide, or global, name. Additionally, the storage device global name entities 816 provide a variable that indicates the type of device for each device associated with each worldwide, or global, name. The variables set of the storage device global name entities 816 are shown below in Table 8.

TABLE 8

VARIABLES OF THE STORAGE DEVICE GLOBAL NAMES 816

| VARIABLE | VARIABLE DEFINITION | VARIABLE TYPE | REQUIRED/ OPTIONAL |
|---|---|---|---|
| WWN_ID | Worldwide (global) name identification number | Number | R |
| WORLD_WIDE_NAME | Worldwide (global) name | Character | R |
| DVC_TYPE | Device type | Character | R |

Interface Component 818 One or more interface component entities 818 is associated with each interface card entity 820. The variable set associated with the interface component entities 818 is set forth below in Table 9.

TABLE 9

VARIABLE SET OF
STORAGE DEVICE INTERFACE COMPONENT ENTITIES 818

| VARIABLES | VARIABLE DEFINITIONS | VARIABLE TYPE | REQUIRED/ OPTIONAL |
|---|---|---|---|
| IF_COMPNT_ID | Interface Component Identification number | Number | R |
| IF_CARD_ID | Interface Card Identification number | Number | R |
| INTERFACE_TYPE | Type of interface | Character | R |
| HW_ADDR | Hardware address | Character | O |
| INTERFACE_SPEED | Speed of Interface | Character | O |
| EFF_BEG_DT | Effective Beginning date | Date | R |
| EFF_END_DT | Effective Ending date | Date | O |
| IF_ALIAS | Interface Alias | Character | O |
| IF_DESCRIPTOR | Interface descriptor | Character | O |
| IF_INDEX | Interface index | Number | O |
| WWN_ID | World wide (Global) name identification number | Number | O |

The variable in Table 9, associated with the interface component entities 818 include an interface component identification number, and an interface card identification number. Additionally, the type of interface is indicated, as is the effective beginning date of the interface component. The effective beginning date corresponds to the first date upon which the device is available to the network. Additional variables of the interface component entities 818 may optionally be provided where necessary to accomplish desired functionality. For example, optional variables corresponding to a hardware address, the speed of the network interface, an effective ending date, an interface alias, an interface descriptor, an interface index, and a worldwide, or global, name identification number may all be provided for as variables of the interface component entities 818. The variables IF_ALIAS and IF_INDEX are switch related variables that are read using SNMP. For example, IF_INDEX stores a value that can be supplied to a switch to access a particular port on that switch. IF_ALIAS stores a MAC address of the device that is plugged in to the other side of the switch. IF_DESCRIPTOR provides a description of the interface which may be set by the user to aid in understanding the relationship of this record to the physical implementation, e.g., this record relates to a particular VLAN.

Interface Card Entities 820

Interface card entities 820 are associated with the device entities 802. The variables associated with the interface card entities 820 are set forth below in Table 10.

TABLE 10

VARIABLE SET OF INTERFACE CARD ENTITIES 820

| VARIABLES | VARIABLE DEFINITIONS | VARIABLE TYPE | REQUIRED/ OPTIONAL |
|---|---|---|---|
| IF_CARD_ID | Interface card identification number | Number | R |
| DVC_ID | Device identification number | Number | R |
| CARD_INDEX | Interface Card index number | Number | O |
| CARD_SERIAL_NUM | Interface card serial number | Number | O |
| SLOT | Interface card slot | Character | O |
| CPU_SPEED | CPU Speed | Character | O |
| MEMORY_QUANTITY | Interface card memory quantity | Character | O |
| EFF_BEF_DT | Effective beginning date | Date | R |
| DRAM_MB | Amount of DRAM in MBs | Number | O |

The interface card variables set forth in Table 10 include an interface identification number for unique identification of each interface card. Additionally, a device identification number, and an effective beginning date are provided by these variables. Additional optional variables may be provided, which are associated with the interface card entities 820, depending upon the functionality desired from the interface card entities 820. For example, variables associated with the interface cards may optionally indicate the interface card index number, serial number, or slot in which it is inserted. Additionally the speed of the central processing unit (CPU), and interface card memory quantity may be indicated. Additionally, the amount of dynamic random access memory (DRAM) may be indicated in megabytes (MBs).

Storage Device VCM Entities 822

The storage device global names are also assigned to one or more storage device VCM entities 822. The VCM (also sometimes referred to as the EMC/ECC) is the controller which provides access to the disk devices within the central storage device, e.g., as mentioned above with respect to step 700. One or more storage device VCM entities 822 may be associated with each storage device storage group entity 808. The variables associated with the storage device VCM entities 822 are indicated below in Table 11.

TABLE 11

VARIABLE SET OF STORAGE DEVICE VCM ENTITIES 822

| VARIABLES | VARIABLE DEFINITIONS | VARIABLE TYPE | REQUIRED/ OPTIONAL |
|---|---|---|---|
| GROUP_VOL_ID | Group identification number | Number | R |
| SERVER_WWN_ID | Server world wide (Global) Names identification number | Number | R |
| ADAPTOR_WWN_ID | Adaptor world wide (Global) Name identification number | Number | R |

In Table 11, the identification numbers associated with the adaptor's and server's worldwide, or global, name is related to the storage medium group identification number. Each of these variables is used by the storage device VCM entities 822 in relation with the other entities illustrated in FIG. 8.

Switching Unit Entities 824

Storage device global name entities 816 are assigned to one or more switching unit entities 824, which may be related to physical switching units, such as the switch of FIG. 6, for example. Table 12 below indicates variable associated with the switching unit entities 824.

TABLE 12

VARIABLE SET OF SWITCHING UNIT ENTITIES 824

| VARIABLES | VARIABLE DEFINITIONS | VARIABLE TYPE | REQUIRED/ OPTIONAL |
|---|---|---|---|
| SWITCH_ID | Switch identification number | Number | R |
| WWN_ID | World wide (Global name identification number | Number | R |
| DOMAIN_NUMBER | Domain number | Number | R |
| HOST | Host name | Character | R |
| ID_ADDR | I.P. address | Character | R |
| OS_VERSION | O.S. version | Character | R |

Each of the variables indicated in Table 12 are important, and associated with the switching unit 824. These variables include a switch identification number, which identifies a unique switching unit. Also, a worldwide, or global, name identification number is given to provide a unique name of the device on the network. A domain number, host name, internet protocol (IP) address, and operating system (OS) conversion are all provided as variables of the switching unit entities 824.

Switch Ports Entities 826

Each switching unit entity 824 is associated with one or more switch port entities 826. These switch port entities 826 may be configured in a manner similar to that illustrated in FIG. 6, or in another suitable manner. The variable set associated with the switch port entities 826 are indicated below in Table 13.

TABLE 13

VARIABLE SET OF SWITCH PORT ENTITIES 826

| VARIABLES | VARIABLE DEFINITIONS | VARIABLE TYPE | REQUIRED/ OPTIONAL |
|---|---|---|---|
| SWITCH_PORT_10 | Switch port identification number | Number | R |
| SWITCH_ID | Switch identification number | Number | R |

TABLE 13-continued

VARIABLE SET OF SWITCH PORT ENTITIES 826

| VARIABLES | VARIABLE DEFINITIONS | VARIABLE TYPE | REQUIRED/ OPTIONAL |
|---|---|---|---|
| WWN_ID | World wide (global) name identification number | Number | R |
| SLOT | Slot identification | Character | R |
| STATUS | Status indication | Character | R |

Each of the switch port entities 826 is identified by a switch port identification number. Additionally, the switch port entities 826 utilize variables that indicate the switch identification number with which the switch port entities 826 are associated, a worldwide name identification number associated with the switch port, a slot identification, and a switch port status indication.

Switch Zone Mapping Entities 828

As illustrated in FIG. 6, each of the switch port entities 826 may be associated with parts of one or more zones of a physical switching unit. As previously discussed, these zones indicate which ports have access to the data of other ports contained within the same zones. In order to facilitate the mapping of switch ports related to the switch port entities 826 into switch zones, each of the switch port entities 826 is defined by one or more switch zone mapping entities 828. These switch zone mapping entities 828 relate to the various switch zone entities 830 in a many-to-one relationship. The variables associated with the switch zone mapping entities 828 are indicated below in Table 14.

TABLE 14

VARIABLE SET OF SWITCH PORT ENTITIES 826

| VARIABLES | VARIABLE DEFINITIONS | VARIABLE TYPE | REQUIRED/ OPTIONAL |
|---|---|---|---|
| ZONE_ID | Zone identification number | Number | R |
| SWITCH_ PORT_ID | Switch port identification number | Number | R |

The switch zone mapping entities 828 make use of a zone identification number, and a switch port identification number. These variables are used to map the zones of the switching unit, such as the switch illustrated in FIG. 6.

Switch Zone Entities 830 The switch zone entities 830 relate to the switch zone mapping entity in a one-to-many relationship. The variables associated with the switch zone entities 830 include a zone identification number, and a zone name, which help to further define the zones of the switching unit, such as those zones illustrated on the switch of FIG. 6. These variables are shown below in Table 18.

TABLE 15

VARIABLE SET OF SWITCH ZONE ENTITIES 830

| VARIABLES | VARIABLE DEFINITIONS | VARIABLE TYPE | REQUIRED/ OPTIONAL |
|---|---|---|---|
| ZONE_ID | Zone identification number | Number | R |
| ZONE_NAME | Zone name | Character | R |

Switch Zone Configuration Entities 832 The switch zone entities 830 are related to one or more switch zone configuration entities 832, which define the configuration of each zone of the switching unit which may change. The variables associated with the switch zone configuration entities 832 are illustrated below in Table 16.

TABLE 16

VARIABLE SET OF SWITCH ZONE CONFIGURATION ENTITIES 832

| VARIABLES | VARIABLE DEFINITIONS | VARIABLE TYPE | REQUIRED/ OPTIONAL |
|---|---|---|---|
| SWITCH CONFIG_ID | Switch configuration identification | Number | R |
| ZONE_ID | Zone identification number | Number | R |

In Table 16, variables associated with the switch zone configuration entities 832 are shown. A switch zone configuration identification number is given, which uniquely identifies each switch configuration. Also given is a zone identification number, which uniquely identifies each zone related to the switch zone configuration entities 832.

Storage Device Switch Configuration Entities 834

The storage device switch configuration entities 834 may be defined by one or more switch zone configuration entities 832. The variable associated with the storage device switch configuration entities 834 are illustrated below in Table 17.

TABLE 17

VARIABLES OF STORAGE DEVIDE SWITCH CONFIGURATION 834

| VARIABLES | VARIABLE DEFINITIONS | VARIABLE TYPE | REQUIRED/ OPTIONAL |
|---|---|---|---|
| SWITCH_ CONFIG_ID | Switch Configuration identification number | Number | R |
| SWITCH_ID | Switch identification number | Number | R |
| CONFIG_ NAME | Name of Configuratiom | Character | R |
| STATUS | Configuration Status | Character | R |

In Table 16, variables associated with the storage device switch configuration entities 832 are illustrated. Particularly, a switch configuration identification number is given along with a switch identification number and the name of the configuration being referred to. Additionally, a status variable indicates the configuration status.

As can be seen from the foregoing description of the entities illustrated in FIG. 8, the present invention involves a complex network which relates the various entities to each other. The purpose for which these variables are given is to provide a convenient environment for provisioning each of the storage device units utilized in the network with various devices by way of switching units. In FIG. 8, the storage device global names are especially useful for uniquely naming and identifying each of the entities shown in the entity relationship diagram of FIG. 8. By way of these variables contained within the entities of FIG. 8, the network, and storage device units may be readily reconfigured for use with different zones, depending upon customer or client demand. In this manner, new devices having new interface cards and new interface components may be added to the network, and may gain access only to those groups contained within the storage device media to which access is desired to be granted. A system administrator may accomplish this by way of using zones to which the various ports of switching units are assigned. These zones provide a convenient mechanism whereby system administrators may readily determine which ports are able to see specific storage information contained within specific blocks or groups on the storage media of the storage device unit.

It will be recognized by those skilled in the art that the entities illustrated in FIG. 8 are not comprehensive, but comprise a set of entities which may be used to facilitate an embodiment of the present invention. However, other entities could be added, or substituted for entities illustrated in FIG. 8 with similar results. Additionally, certain entities illustrated in FIG. 8 could be combined with others, or removed entirely if their functionality is transferred to another of the entities illustrated, with similar results. Such variations are fully anticipated, and intended to be encompassed within the scope of the present invention.

Although the data model described above will have many applications associated with the process of provisioning a central storage device, one such application involves the automation of the steps set forth in FIG. 7. In part, this means that the data model described above shall be periodically updated so that the variable values which are stored in each table accurately reflect the current state of the central storage device(s), switch(es) and host device(s). Additionally, automated techniques according to the present invention shall be used to extract information from the data model which information is then used to determine commands which are used to perform the steps described in FIG. 7. More specifically, the general steps of FIG. 7 can be implemented by determining a series of commands which are used to configure the central storage device 30, the switch(es) and the host device as follows.

Step 700—Informing the Central Data Storage Device of the Host's Authorization

As mentioned above, employing a switching matrix enables the data pipes between each fiber switch and the central storage device to aggregate data transactions associated with multiple host devices. Since multiple host devices are, therefore, using each port on the central data storage device, it is necessary for the central data storage device to provide access to different storage areas via each of its ports. To accomplish this function, each central storage device 30 will typically include a volume on which is stored a database that masks the data based on the authorization granted to each host device. This database can be edited for the purpose of granting new rights, e.g., those described in table above, as part of the provisioning process.

For example, if the central storage device 30 is an EMC frame, then this editing process can be performed using a utility provided by the EMC Corporation known as fpath. More specifically, the fpath utility includes functions for backing up the database, adding a new host device, changing the name of a host, listing the contents of the database and refreshing the configuration of the database which are used in this process. These functions can be used as described in the flow diagram of to inform the central storage device 30 of the new host's access authorization.

Therein, at step 900, the database is backed up to preserve the original records. Next, at step 902, an entry is added to the data base using the appropriate fpath command for adding a device. This command will include, as arguments, a unique identifier of the host (sometimes referred to as a worldwide name (wwn)), the port on the central storage device through which this host will obtain access and the range of storage (e.g., as in the table) to which this host will be permitted access. Next, optionally, an alias of the entry created in step 902 may be added to the database at step 904 to make it easier to visually locate the entry of step 902 in the database. Finally, the entries are verified using the fpath listing function (step 906) and the database can be saved (step 908) to complete the task of informing the central storage device 30 of the new host's access authorization.

Step 702—Creating a Path Through the Switching Matrix by Zoning

Figure 10:
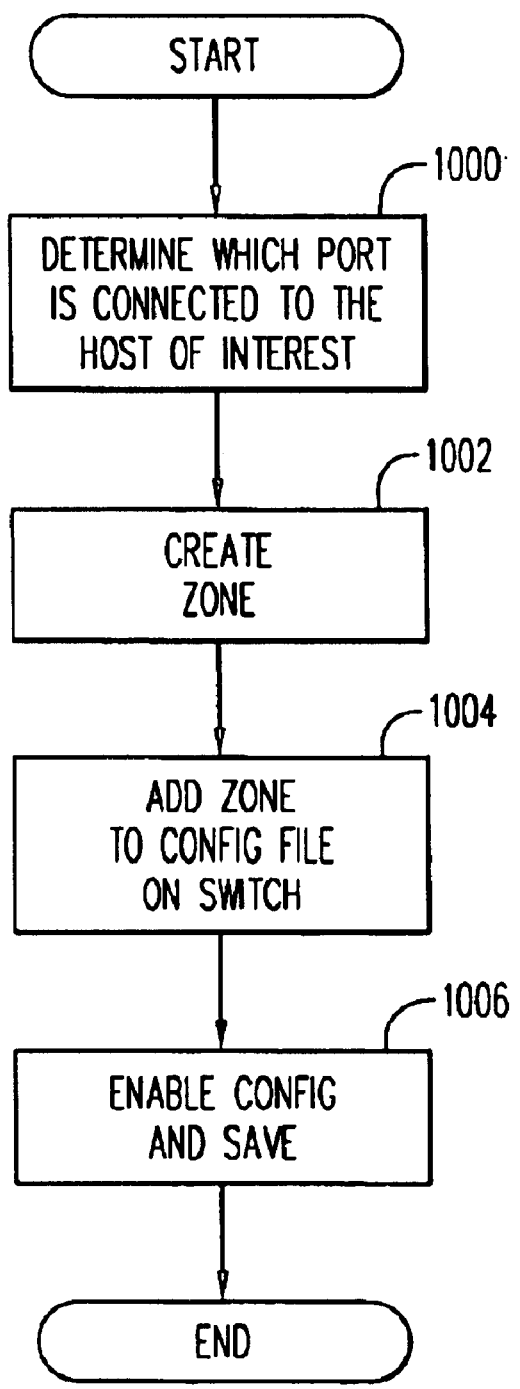

The next step in the provisioning process of FIG. 7 is to establish the zones on the switch which aggregate multiple hosts ports on the switch to a single central storage device port on the switch, as depicted conceptually in FIG. 6. Each time a host is added, and occasionally when a reconfiguration is performed, the switch zoning will be changed. This can be accomplished as set forth in the flow diagram of FIG. 10. Therein, at step 1000, it is first determined the switch port to which the host of interest is connected. This can be accomplished by establishing a Telnet session with the switch using access terminal 43 which can establish a communication link with a processor (not shown) embedded in the switch. Those skilled in the art will be aware of various Telnet emulation programs which can be used to establish these types of communication sessions. Once the Telnet session is established, the port connections of the switch can be revealed using a "Switchshow" command, which command might, for example, reveal:

| port 11: | 20:00:00:e0:69:c0:18:3cm0042sc11 | fca-pci0 |
| port 12: | 20:00:00:e0:69:c0:17:59m0043sc11 | fca-pci0 |
| port 13: | 50:06:04:82:bc:01:be:00sym2584 | fa1a |
| port 15: | 50:06:04:82:bc:01:c7:40sym2621 | fa1a |

For this example, therefore, zoning requires the addition of port 11 to the zone which includes port 15. This is performed in step 1002 by executing a "zoneCreate" command via the Telnet session with the switch as:

zoneCreate "AAACORP_m0042_fca0_sym2621_fa1A", "1,15;1,11"

Then, at step 1004, the zone is added to a selected configuration file to be stored on the switch, again using a suitable Telnet command. Each fiber switch 34, 36, 38, and 40 may have multiple configuration files which accumulate the matchings between host ports and central storage device ports on the switch. At step 906, the new configuration is enabled via the terminal 43 which performs compilation and verification of the new configuration. If errors are detected by the switch processor, then the switch will indicate the error to the terminal 43 and the configuration will not be modified. Otherwise, the new configuration is saved and the zoning step is complete.

Step 704—Informing the Host How to Find the Allocated Storage

Once the central storage device 30 and the switching matrix 32 are ready to present the specified storage space to the new host, the next step is to configure the host so that it can access the specified storage space. This is accomplished by modifying a configure file (sd.conf) stored in the host and rebooting the host. The syntax for this command is:

name = "sd" class="scsi" target = <t> lun = <d>
hba="<hba>" wwn="<fa-wwn>";
where   <t> is the target number
        <d> is the lun number

```
<hba> is the hba
<fa-wwn> is the symm's fa wwn
```

Thus, for host m0042sc11:

```
# switch 1
name = "sd" class = "scsi" target = 0 lun = 3 hba = "fca-pci0"
wwn = "50060482bc01c740";
name = "sd" class = "scsi" target = 0 lun = 4 hba = "fca-pci0"
wwn = "50060482bc01c740";
name = "sd" class = "scsi" target = 0 lun = 5 hba = "fca-pci0"
wwn = "50060482bc01c740";
```

A process referred to as persistent binding can then be applied to tie devices to a specific wwn in the central storage device.

Figure 11:
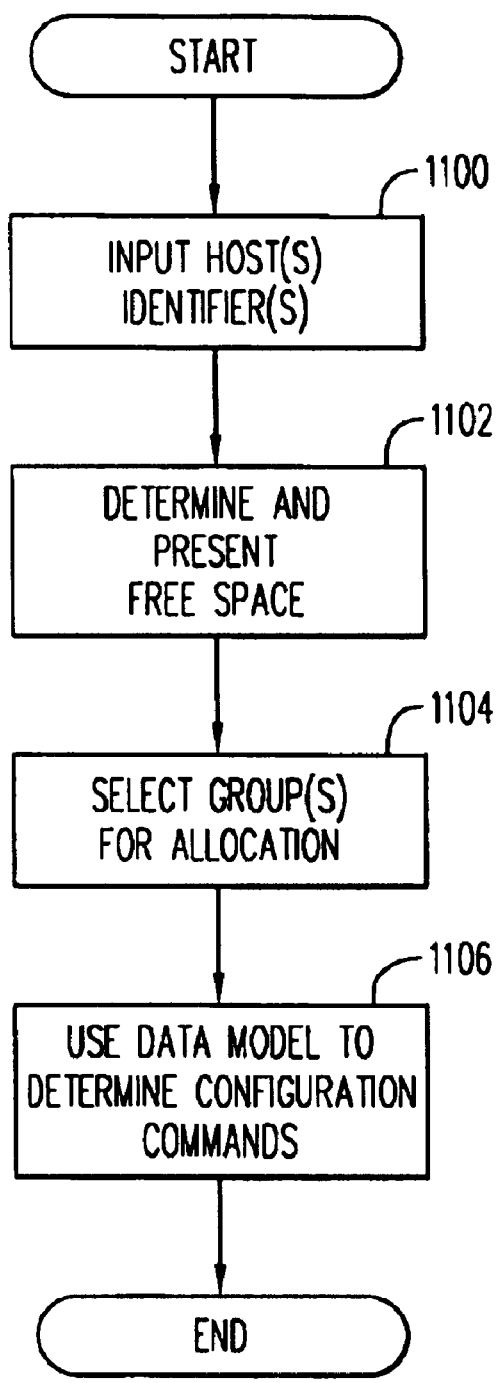
FIG. 11 is a flow diagram illustrating steps for automated provisioning of a central storage device using a data model according to an exemplary embodiment of the present invention.

To ease the configuration process associated with the steps of FIG. 7, exemplary embodiments of the present invention automate much of the process using the data model of FIG. 8. More specifically, exemplary embodiments request certain information from a user who wishes to provision the central storage, extract information from the data model of FIG. 8 (stored as a number of database tables) and process that information to output the configuration commands which can be used to provision the central storage device. A general method for automating the provisioning of a central storage device using a data model according to an exemplary embodiment of the present invention will now be described with reference to the flow diagram of FIG. 11 and the exemplary software code attached as Appendix A.

Therein, at step 1100 the user inputs one or more identifiers associated with the host(s) to which he or she wants to allocate storage from the central storage device 32. The software code set forth in Appendix A uses this information to first determine, and then present a list of free storage groups (also sometimes referred to as "metavolumes" that are in the same location as the hosts, e.g., using the information stored in the storage device group entities 808 and the information stored in the device entities 802 of the data model. The user then selects one (or more) groups for allocation at step 1104. The software then continues to output the commands for configuring the central storage device, the host(s), and the switch(es) at step 1106, again by using information stored in the data model.

For example, with reference to the three steps outlined in FIG. 7, the software extracts information using information from the following tables in FIG. 8: device entities 802, interface card entities 820, interface component entities 818, storage device group entities 808, adaptor group ports 810 and switch zones 830. The fpath commands can be generated by looking up the wwnames, which are stored in the variable hw_addr of interface component entities 818 on the host, the slot of the fa, which are stored in the interface card entities 820, and the volumes, stored in the storage device groups entity 808. Similarly, for switch zone configuration, the commands are derived by the software in Appendix A using information in the data model regarding the switches to which the selected host(s) is connected to using information stored in the interface card entities 820 and interface component entities 818 of the data model and the ports of the central storage device on which the selected group(s) is available (using information stored in entities 808, 810 and 818. Moreover, the sd.conf file can be modified by extracting and manipulating, per the attached software code, the wwname of the central storage device on which the allocated group of storage is available, the interface card of the host to which the storage is being allocated, the target field in the devices entity 802 and the logical unit number stored in the storage device groups entity 808.

It will be appreciated by those of ordinary skill in the art that the present invention can be embodied in other specific forms without departing from the spirit or central characteristics thereof. For example, the present invention has been described in connection with various entities contained within a computer network, which may be expressed in an entity relationship diagram. Each of these entities in turn, is described with reference to specific variables contained therein. However, it will be apparent to those skilled in the art that the entities and variables discussed in connection with the present invention may vary without departing from the spirit thereof. Thus, variables and entities may be combined, renamed, or rearranged to provide a similar function as the present invention, or a slightly different function according to the desires of the skilled artisan. Additionally, the present invention is directed to a system and method for automated provisioning of central data storage devices, which allows for multiple network clients to share a centralized storage device without sharing access to their information. However, it will be recognized by those skilled in the art that clients may desire to share their information with specified individuals or companies, and therefore may increase the number of parties having access to this information, according to the individual client's goals and desires.

The presently disclosed embodiments are, therefore, considered in all respects to be illustrative and not restrictive. The scope of the invention is indicated by the appended claims, rather than the foregoing description, and all changes that come within the meaning and range of equivalence thereof are intended to be embraced therein.

APPENDIX A

```
# make metas list of metavolume objs, hosts = list of device obj
    def gen_cmds( metas, hosts ):
    switch_cmds { }
    host_cmds = { }
    symm_cmds = init_symms( metas )
    # loop through list of hosts
    for host in hosts:
        host_str = gen_host_str( spin.Device.getHostname( {"id" : host["dvc_id"] }) )
        #host_str = "gamerarsch"
        host_cmds[host["dvc_id"]] = { }
```

APPENDIX A
-continued

```
        if_card = spin.Device.getChildren( {"id":host["dvc_id"], "child_class" : "InterfaceCard"}
)
        # find the jcore card (and emulex, too, soon) on the host
        for card in if_card:
            if_comps = spin.InterfaceCard.getChildren( {"child_class":"InterfaceComponent", "id" : card["if_card_id"]})
            # the cards that are connected to the SAN
            if if_comps[0]["interface_type"] == "FIBER CHANNEL":
                # loop through ports on the card
                for comp in if_comps:
                    sw_pt_host = spin.InterfaceComponent.get( {"id" : comp["connected_to_id"]}
)
                    sw_pt_host_cd = spin.InterfaceComponent.getParent( {"id" : sw_pt_host["if_compnt_id"], "parent_class" : "InterfaceCard"} )
                    try:
                        switch = spin.InterfaceComponent.getConnectedDevice( { "id": comp["if_compnt_id"]})
                    except:
                        raise "Error", "Connection cannot be found from host %s to switch" % spin.Device.getHostname( {"id" : host["dvc_id"]})
                        return
                    switch = spin.Device.get( {"id" : 2344})
                    # wwname zoning possible after switches are upgraded
                    sw_cfg = find_active_cfg( switch )
                    cfg_name = sw_cfg["config_name"]
                    #sw_nm = spin.Device.getLocation( {"id" : switch["dvc_id"]} ) XXXXX
                    sw_nm = "research"
                    switch_name = sw_nm + "switch" + switch["system_object_id"]
                    if not host_cmds[host["dvc_id"]].has_key(switch["dvc_id"]):
                        host_cmds[host["dvc_id"]] [switch["dvc_id"]] = ["#" + switch_name]
                    if not switch_cmds.has_key( switch["dvc_id"]):
                        switch_cmds[switch["dvc_id"] ] = [switch_name]
                        switch_cmds[switch["dvc_id"]].append( "-------------------")
                    # loop through metas to allocate to this host
                    for meta in metas:
                        (fa_comp, fa_card) = find_fa( meta, switch )
                        fa_wwn = fa_comp["hw_addr"]
                        meta_fa = fa_card["slot"]
                        fa_str = "fa" + meta_fa
                        sw_port_emc = spin.InterfaceComponent.get( {"id" : fa_comp["connected_to_id"]})
                        sw_port_card = spin.InterfaceComponent.getParent( {"id" : sw_port_emc["if_compnt_id"], "parent_class" : "InterfaceCard"})
                        emc = spin.EMCMetaVolume.getParent( {"parent_class" : "Device", "id":meta["meta_vol_id"]})
                        #emc_str = spin.Device.getSymmName( {"id" : emc["dvc_id"]} ) XXXXXXXXXXXXX put this in SPIN later
                        emc_str = "symm" + emc["serial_num"][6:] # last four digits of serial numberto uniquely identify emc's
                        zone_name = host_str + "_" + card["slot"] + "_" + emc_str + "_" + fa_str
                        ports = switch["system_object_id"] + "," + sw_port_card_slot"] + ";" + switch["system_object_id"] + "," + sw_pt_host_cd["slot"]
                        hyper_str = meta["head_hex_addr"] + "-" + meta["tail_hex_addr"]
                        switch_cmds[switch["dvc_id"]].append( "zonecreate \" " + zone_name + "\",\" " + ports + "\"")
                        switch_cmds[switch["dvc_id"]].append( "cfgadd \" " + cfg_name + "\", \" " + zone_name + "\"")
                        symm_cmds[meta["dvc_id"]].append( "fpath adddev -w " + comp["hw_addr"] + "-f" + meta_fa + "-r \"" + hype_str + "\" ")
                        # you only want to do this ONCE per symm, not per meta. check it out later
                        awwn = host_str + "/" + card["slot"]
                        symm_cmds[meta["dvc_id"]].append( "fpath chgname -w " + comp["hw_addr"] + "-f" + meta_fa + "-n \"" + awwn + "\" ")
                        # make sure that target gets populated somehow
                        target = emc["target"]
                        switch_str = "name=\"sd\"class=\"scsi\"target=" + target + "lun=" + meta["lun"] + "hba=\" " + card["slot"] + "\" wwn=\" " + fa_wwn + "\"; "
                        host_cmds[host["dvc_id"]][switch["dvc_id"]].append ( switch_str)
    for symm, cmds in symm_cmds.items( ):
        cmds.append( "fpath lsdb -s on")
        cmds.append( "[verify]")
        cmds.append( "fpath backupdb -o /root/vcm/$MYSYM.'date + %d%m%Y_%H%M%S'")
)
        cmds.append( "fpath refresh")
    for switch, cmds in switch_cmds.items( ):
        cmds.append( "cfgenable \"" + cfg_name + "\" ")
```

-continued

APPENDIX A

```
        cmds.append( "cfgsave")
    print switch_cmds, symm_cmds, host_cmds
    return (switch_cmds, symm_cmds, host_cmds)
def find_active_cfg( switch ):
    cfgs = spin.Device.getChildren( {"id" : switch["dvc_id"], "child_class" : "EMCSwitchConfig"})
    for cfg in cfgs:
        if cfg["status"] == "ACTIVE":
            return cfg
    return None
# this function finds all the symms that all the metas are in.
def init_symms( metas ):
    symm_cmds { }
    for meta in metas:
        if not symm_cmds.has_key( meta["dvc_id"] ):
            symm_cmds[meta"dvc_id"]]= ["fpath backupdb -o /room/vcm$MYSYM. 'date +
%d%m%Y_%H%M%S'"]
    return symm_cmds
def find_fa( meta, switch ):
    try:
        # list of all fa's this meta is available on
        if_comps = spin.EMCMetaVolume.getChildren( {"id" : meta["meta_vol_id"],"child_class"
: "InterfaceComponent"})
        for if_comp in if_comps:
            if if_comp["connected_to_id"]:
                conn_ic = spin.InterfaceComponent.getSibling({"id":if_comp["if_compnt_id"].
"sibling_class" : "InterfaceComponent" })
                conn_dvc = spin.InterfaceComponent.getParent({"id":conn_ic["if_compnt_id"],
"parent_class" : "Device" })
                # if this switch is the same switch that the host is connected to
                if conn_dvc["dvc_id"] == switch["dvc_id"]:
                    if_card = spin.InterfaceComponent.getParent( {"parent_class":
"InterfaceCard", "id":if_comp["if_compnt_id"] })
                    # makes assumption here that slot is 1a, 1b, not just 1
                    return (if_comp, if_card)
    except:
        traceback.print_exc( )
        # what exception to raise?
        return (" ", " ")
def gen_host_str( hostname):
    host_re = re_compile("(\w+)\.(\w+)\.\w+\.\w+")
    host_obj = host_re.search( hostname)
    if host_obj:
        host = host_obj.group(1)
        subdom = host_obj.group(2)
        return host + subdom
    else:
        raise BadHost, "Badly formed hostname"
def gen_objs( meta_list, hosts ):
    metas = [ ]
    host_objs = [ ]
    for meta in meta list:
        meta_obj = spin.EMCMetaVolume.get( {"id" : meta })
        metas.append( meta_obj)
for host in hosts:
        # host_obj = spin.Device.get( {"hostname" : host })
        host_obj = spin.Device.get( {"id" : 2287 })
        host_objs.append(host_obj )
    return (metas, host_objs)
hosts = args["hosts"] [0]
hosts = urllib.unquote( hosts )
hosts = string.replace( hosts, "+", "<br>")
meta_list = args["metas"]
metas = " "
for meta in meta_list:
    metas = metas + meta + "<br>"
(meta_objs, hos_objs) = gen_objs( meta_list, string.split(hosts, "<br>"))
(switch_cmds symm_cmds, host_cmds) = gen_cmds( meta_objs, host_objs)
switch_cmd_str = " "
symm_cmd_str = " "
host_cmd_str = " "
print repr(switch_cmds) + "\n\n" + repr(symm_cmds) + "n\n" + repr(host_cmds)
for switch, cmds in switch_cmds.items( ):
    for cmd in cmds:
        switch_cmd_str = switch_cmd_str + cmd + "<br>\n"
for emc, cmds in symm_cmds.items( ):
    emc_str = "symm" + spin.Device.get( {"id":emc})["serial_num"][ 6:]
    symm_cmd_str = symm_cmd_str + emc_str + "<br>\n" + "----------------" + "<br>\n"
```

-continued

APPENDIX A

```
    for cmd in cmds:
        symm_cmd_str = symm_cmd_str + cmd + "<br>\n"
for host, cmds in host_cmds.items( ):
    # host_str = spin . Device.getHostname( {"id":host}) XXXXXXX
    host_str = "gamera .rsch .loudcloud .com"
    host_cmd_str = host_cmd_str + host_str + " sd.conf<br>\n" + "--------" + "<br>\n"
    for switch, edits in cmds.items( ):
        for edit in edits:
            host_cmd_str = host_cmd_str + edit + "<br>\n"
self.page.write("""
<h2>EMC Storage Provisioning</h2>
<b>SELECTED HOST(S) TO PRESENT STORAGE TO:</b><br><br>
%s<br><br>
<b>SELECTED METAS:</b><br><br>
%s<br><br>
<b>GENERATED COMMANDS:</b><br><br>
%s<br>
%s<br>
%s<br><br>
<form method=get action="configure.py">
<input type="submit" value="Go do it" disabled>
</form>
"""% (hosts, metas, switch_cmd_str, symm_cmd_str, host_cmd_str) )
self.runpage( "/common/footer. py")
```

What is claimed is:

1. A method for allocating storage to a host within a central data storage device having at least one switch disposed therebetween, said method comprising the steps of:

(a) informing the central storage device that the host is authorized to access a predetermined storage area, said predetermined storage area being a subset of said unallocated storage space;

(b) creating a path through the switch between said central data storage device and said host; and (c) informing the host that said predetermined storage area has been allocated thereto,
wherein at least one of steps (a)–(c) is performed using information extracted from a data model associated with said central storage device.

2. The method of claim 1, wherein said step of informing the central storage device further comprises the steps of:

modifying a database which is used to coordinate access to said central storage device.

3. The method of claim 2, wherein said step of informing further comprises the steps of:

backing up said database;

adding a new entry to said database which includes an identifier of said host and said predetermined storage area;

verifying said new entry; and saving said database with said new entry.

4. The method of claim 3, further comprising the step of:

adding an alias entry to said database.

5. The method of claim 1, wherein said step of creating a path through said switch further comprises the step of:

determining, using said data model, an identity of a port in said switch that is connected to said host.

6. The method of claim 5, wherein said step of determining further comprises the steps of:

establishing a communication session with said switch using an access terminal; and executing a command which reveals a correspondence between switch ports and host identifiers.

7. The method of claim 5, wherein said step of creating a path further comprises the step of:

creating a zone between a port within said switch that is connected to said host and a port within said switch that is connected to a port on said central storage device through which said host can access said predetermined storage area.

8. The method of claim 7, wherein said step of creating a path further comprises the steps of:

adding said zone to a configure file stored in said switch; and enabling and saving said configure file within said switch.

9. The method of claim 1, wherein said step of informing the host that said predetermined storage area has been allocated thereto further comprises the step of:

modifying a configure file stored in said host to provide information regarding said predetermined storage area.

10. The method of claim 9, further comprising the step of:

running another software routine which identifies how said configure file needs to be modified.

11. The method of claim 1, wherein said step of informing the central storage device further comprises the step of:

determining, via a software routine that extracts information from said data model, a plurality of commands for execution to inform said central storage device of said predetermined storage area.

12. The method of claim 1, wherein said step of creating a path further comprises the step of:

determining, via a software routine that extracts information from said data model, a plurality of commands for execution which create said path through said switch.

13. The method of claim 1, wherein said step of informing the host further comprises the step of:

determining, via a software routine that extracts information from said data model, modifications to a configure file which inform said host that said predetermined storage area has been allocated thereto.

14. A computer-readable medium which stores machine readable program code for executing the steps of:

using a data model associated with a central storage device to determine at least one of:
  (a) a first set of commands for modifying a database associated with access rights on a central storage device;
  (b) a second set of commands for modifying a switch configuration to provide a path between a host device and said central storage device; and
  (c) a third set of commands for modifying a configure file associated with said host device to inform said host device that a predetermined storage area has been allocated thereto.

15. The computer-readable medium of claim 14, wherein said program code is further executable to perform the steps of:
  determining unallocated storage space on said central storage device; and
  using said determined unallocated storage space in the at least one of steps (a), (b) and (c).

16. The computer-readable medium of claim 14, wherein said step of determining (a) a first set of commands for modifying a database, further comprises determining commands usable to perform the steps of:
  backing up said database;
  adding a new entry to said database which includes an identifier of said host device and said predetermined storage area;
  verifying said new entry; and
  saving said database with said new entry.

17. The computer-readable medium of claim 16, wherein said first set of commands further comprises a command for performing the step of:
  adding an alias entry to said database.

18. The computer-readable medium of claim 14, wherein said second set of commands for modifying said switch configuration includes a command for performing the step of:
  determining an identity of a port in said switch that is connected to said host device.

19. The computer-readable medium of claim 14, wherein said second set of commands for modifying said switch configuration includes a command for performing the step of:
  creating a zone between a port within said switch that is connected to said host device and a port within said switch that is connected to a port on said central storage device through which said host can access said predetermined storage area.

20. The computer-readable medium of claim 19, wherein said second set of commands for modifying said switch configuration includes a command for performing the steps of:
  adding said zone to a configure file stored in said switch; and
  enabling and saving said configure file within said switch.

21. The computer-readable medium claim 14, wherein said third set of commands for modifying a configure file associated with said host device includes a command for performing the step of:
  modifying a configure file stored in said host device to provide information regarding said predetermined storage area.

* * * * *